Figure 1:
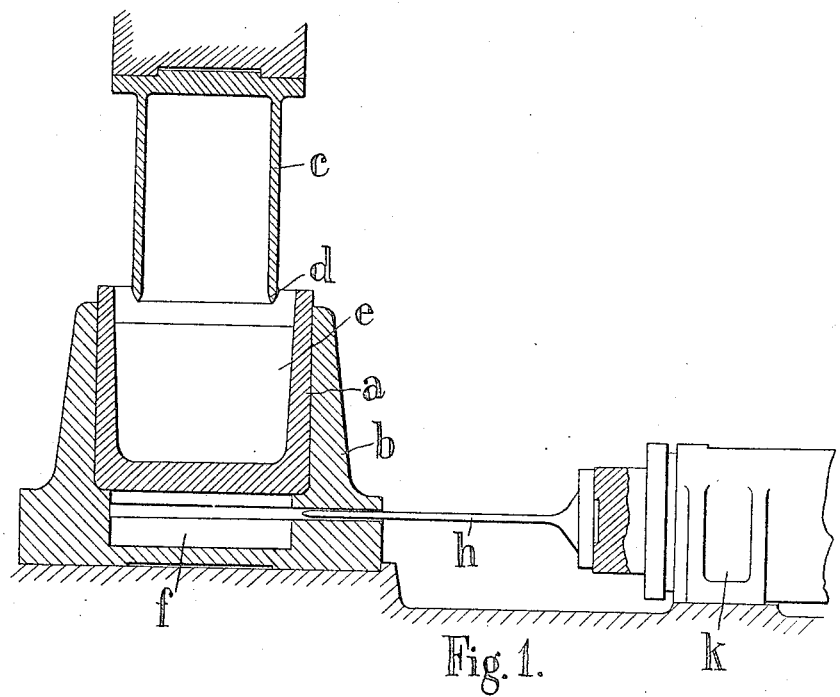

Aug. 14, 1923.

C. A. PARSONS ET AL 1,465,022

MANUFACTURE OF OPTICAL GLASS

Filed July 17, 1922

INVENTORS:
CHARLES A. PARSONS,
CYRIL J. PEDDLE,
HUGH M. DUNCAN.

by Spear, Middleton, Donaldson & Hall
Attys.

Patented Aug. 14, 1923.                                                                              1,465,022

UNITED STATES PATENT OFFICE.

CHARLES ALGERNON PARSONS, OF NEWCASTLE-UPON-TYNE, CYRIL JAMES PEDDLE, OF DERBY, AND HUGH MALCOLM DUNCAN, OF NEWCASTLE-UPON-TYNE, ENGLAND, SAID PEDDLE AND DUNCAN ASSIGNORS TO SAID PARSONS.

MANUFACTURE OF OPTICAL GLASS.

Application filed July 17, 1922. Serial No. 575,609.

*To all whom it may concern:*

Be it known that we, CHARLES ALGERNON PARSONS, a subject of the King of Great Britain and Ireland, and residing at Heaton Works, Newcastle-upon-Tyne, in the county of Northumberland, England, CYRIL JAMES PEDDLE, a subject of the King of Great Britain and Ireland, and residing in Derby, in the county of Derby, England, and HUGH MALCOLM DUNCAN, a subject of the King of Great Britain and Ireland, and residing at Heaton Works, Newcastle-upon-Tyne, in the county of Northumberland, England, have invented certain new and useful Improvements in the Manufacture of Optical Glass, of which the following is a specification.

The present invention relates to the manufacture of optical glass.

According to the usual method of preparing optical glass, after the batch mixture has been melted and fined it is well stirred by hand or mechanical means while slowly cooling and until it become too cold and viscous to permit of further stirring; the stirrer may or may not be removed from the pot. The cooling is continued slowly in its furnace or after removal to a cooling chamber or lehr until quite cold. The glass contents of the pot are found almost invariably to be cracked into a number of pieces of irregular size and shape, and consequently there ensues a great loss of good glass before it can be delivered in suitable form to the optical instrument manufacturer.

The object of the present invention is to secure from a given amount of materials employed a larger percentage of optical glass of good quality than has heretofore been obtainable.

We have found that the cracking is primarily due to the larger coefficient of contraction of the glass as compared with that of the material of the pot, which causes tension in the glass greater than it can withstand.

The present invention consists in allowing the glass to cool in the pot until it has reached the stage at which it is still viscous but able to retain its shape without support and at this stage isolating the bulk of the glass from the pot by separation of the latter therefrom.

The invention also consists in the improved process set forth in the preceding paragraph in which the separation of the pot is effected by punching, shearing, trepanning, melting, or by other means and then removing the portion or portions of the pot adhering to the glass so isolated so that a large proportion of the glass is obtained free from attachment to any part of the pot and after slow cooling is free from cracks and feathers.

The invention further consists in an improved process as set forth in the penultimate paragraph in which the pot is subjected externally to hammering, squeezing, rolling or other treatment which will break it up into comparatively small pieces or even pulverize it, these pieces being then peeled off the mass of glass in the pot.

The invention also consists in the improved methods of and means for the manufacture of optical glass hereinafter described.

Referring to the accompanying drawings:—

Figure 2:
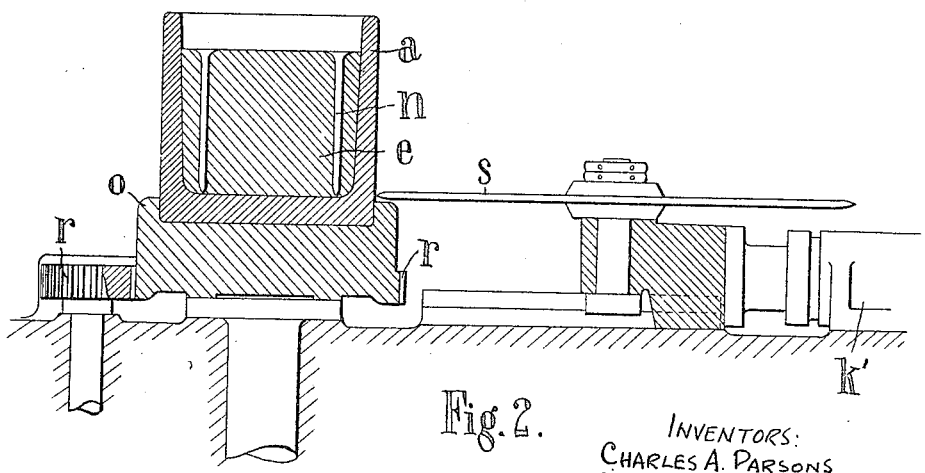

Figure 1 shows a sectional elevation for the most part in section of suitable apparatus for carrying into effect one form of the improved process, Figure 2 showing a similar view of a modified form of apparatus.

In carrying out the invention according to one form as shown in Figure 1, an open pot, $a$, or one with a removable top is used. When the stirring process is completed the pot is allowed to cool further until the glass is of a consistency between that of cheese and of lead. The pot is then rapidly removed from the furnace or lehr and placed in an iron jacket, $b$, under a press, (not shown) and a tube, $c$ of steel of somewhat smaller diameter than the inside of the pot, with sharpened lower edge, $d$, and painted with kaolin or other suitable lubricant paint, is forced down rapidly into the mass of glass, $e$, in the pot. In the bottom of the jacket there is a circular recess, $f$, of diameter slightly greater than the steel tube and a depth somewhat greater than the thickness of the bottom of the pot so that the steel tube can shear out a circular disc of pot bottom into this recess. A column of glass by these operations is thus severed from the mass and attached to a circular section of the bottom of the pot. The tube, $c$, is then slightly lifted and a horizontally moving knife, $h$, with sharpened edge, $i$, actuated by a ram, $k$ and entering a horizontal slot opening, $m$, at the base of the jacket, shears off the adhering bottom of the pot from the column of glass; the tube and column of glass may then be removed. Upper and lower auxiliary rams may be provided to assist in handling the ingot of glass. During this process kaolin, alumina, or other powder may be used to prevent sticking.

According to a modification, after the steel tube has been forced into the mass of glass, it may be quickly withdrawn, the annular space left filled with kaolin or the like, and by means of the auxiliary rams the column may be bodily removed and the adherent bottom sheared off.

Though a circular steel tube is mentioned, a ram head of any suitable section may be used so as to produce instead of one ingot column of glass any suitable section or sections of glass.

Further, the ingot may be cut up or pressed or rolled while still soft into slabs of any form.

According to another modification, (see Figure 2) instead of forcing the steel tube, $c$, with sharpened edge through the bottom of the pot, the tube may be arrested before touching the bottom and then withdrawn, leaving an annular cavity, $n$, which is quickly filled with kaolin or other suitable substance to prevent the central column of glass adhering to the surrounding annulus; the pot having then been removed from the jacket is placed in a shallow chuck, $o$, rotatably mounted and driven by spur gearing, $r$, and a series of sharp rollers or cutters, $s$, one of which is shown in Figure 2, forced against it as by the ram, $k'$, to sever the bottom of the pot as a whole from the glass.

Instead of punching and shearing, trepanning may be used, and instead of a steel tube with sharpened edge a tube with teeth cut and set in its edge may sever out a column of glass by rotation, or again a large circular saw may be sometimes used instead of the knife. In such arrangements suitable surface speeds must be chosen.

In carrying out the invention according to another method the pot may be isolated from the glass by the application of intense exterior heat quickly applied; in carrying out this method the pot after stirring is allowed to cool slowly till the glass has become solid throughout its mass, but not so cold as to cause cracking. It is then removed from its furnace, holes are drilled or otherwise made in the bottom and sides of the pot, and it is placed bottom upwards in a furnace previously heated to a high temperature. Powerful burners are turned on to play on the bottom and sides, so that the layer of glass next the pot becomes fluid and the centre block of glass drops out into a suitable receptacle, air entering by the holes to replace the glass. To assist the removal of the glass, air under pressure may be delivered through suitable pipes into the holes.

To facilitate the perforation of the pot, indents may be formed in the bottom or sides during manufacture, so as to leave locally a small thickness which may be easily punched through at high temperatures without breaking the pot.

Any convenient means such, for example, as acetylene-oxygen burners or electric furnaces may be used in the heating of the pot or to melt out or isolate the central block of glass.

According to the second main form of this invention, according to which some form of peeling operation is used, it may be desirable to cool the pot after it has been broken by hammering, squeezing, rolling as above set forth by such means as a cold air blast or by directing sprays of water or other liquid either on to the outside or on to the adjacent layers of glass. By thus locally cooling the pieces of the pot or the glass to which they immediately adhere local contraction and cracking occurs, enabling the pieces to be readily removed.

The pot may also be externally cooled before the application of mechanical force.

In some cases it may be necessary to subject the pot alternately to the breaking and cooling processes several times in succession until all the broken pieces have been removed from the mass of glass.

Having now described our invention what we claim as new and desire to secure by Letters Patent is:—

1. A method of manufacturing optical glass which consists in allowing the glass to cool in the pot, until it has reached the stage at which it is still viscous but able to retain its shape without support and at this stage separating glass and pot, substantially as and for the purpose described.

2. A method of manufacturing optical glass as claimed in claim 1, in which the pot is separated piecemeal from the glass, as set forth.

3. A method of manufacturing optical glass as claimed in claim 1, in which the pot is mechanically divided into a plurality of pieces, as set forth.

4. A method of manufacturing optical glass according to claim 1, according to which a tube is forced into the glass, thereby serving to separate the bulk of the glass from the sides of the pot, as set forth.

5. A method of manufacturing optical glass according to claim 1, according to which a tube is forced into the glass, thereby serving to separate the bulk of the glass from the sides of the pot, and the bottom of the pot subsequently divided from the sides, as set forth.

6. An apparatus for manufacturing optical glass, including means for supporting a pot containing glass, and means for separating the bottom of a pot from its sides, said means being adapted to pass downwardly between the main body of the glass within the pot, and the side of the pot through the bottom of the pot and into proximity to the support.

7. An apparatus for manufacturing optical glass as in claim 6, including a pot support having a recess therein to receive the severed bottom of the pot, as set forth.

8. An apparatus for manufacturing optical glass as in claim 6, in which the support has in addition an aperture through which appropriate means can be introduced to detach the bottom of the pot from the glass, as set forth.

In testimony whereof we have signed our names to this specification.

CHARLES ALGERNON PARSONS.
CYRIL JAMES PEDDLE.
HUGH MALCOLM DUNCAN.